United States Patent [19]
Pedinoff

[11] 3,735,279
[45] May 22, 1973

[54] COLINEAR HETERODYNE FREQUENCY MODULATOR

[75] Inventor: Melvin E. Pedinoff, Canoga Park, Calif.

[73] Assignee: Hughes Aircraft Company, Culver City, Calif.

[22] Filed: Dec. 10, 1970

[21] Appl. No.: 97,003

Related U.S. Application Data

[63] Continuation of Ser. No. 646,867, June 19, 1967, abandoned.

[52] U.S. Cl. ............... 331/94.5, 350/161, 307/88.3
[51] Int. Cl. .................................................. H01s 3/10
[58] Field of Search ................. 331/94.5; 330/4.3; 332/7.51; 307/88.3; 350/161; 356/28

[56] References Cited

UNITED STATES PATENTS 3,297,876  1/1967  DeMaria ........................... 250/199
3,544,805  12/1970  DeMaria ........................... 307/88.3

OTHER PUBLICATIONS

Siegman et al., APPLIED PHYSICS LETTERS, Vol. 5, No. 1, 1 July 1964, pp. 1–2. SC1 A745.
Giarola et al., PROC. IEEE, Vol. 15, No. 8, Aug. 1963, pp. 1150–1151. TK5700 I7.

*Primary Examiner*—Ronald L. Wibert
*Assistant Examiner*—R. J. Webster
*Attorney*—James K. Haskell and E. F. Oberheim

[57] ABSTRACT

An apparatus to produce Brillouin scattering by means of two oppositely directed colinear optical beams, frequency-translated and of varying power level, in a time sequence suitable for processing doppler-shifted radar target echoes by means of a simplified optical heterodyne detection system.

6 Claims, 2 Drawing Figures

Patented May 22, 1973

3,735,279

INVENTOR.
MELVIN E. PEDINOFF,
BY
J.K. Haskell

ATTORNEY.

3,735,279

COLINEAR HETERODYNE FREQUENCY MODULATOR

This application is a continuation of Ser. No. 646,867, filed June 19, 1967, now abandoned.

This invention relates to apparatus known in the art as frequency modulators, and especially to modulators of heterodyne frequencies, but which principally perform the function of signal translation. More particularly, the invention relates to apparatus for modulating frequency-translated, colinear optical beams.

The production of radiation of the type to which the present invention appertains is based upon the interaction of sound waves at microwave frequencies and electromagnetic waves at optical frequencies, and is termed in the art "Brillouin scattering". It is also known that by means of stimulated Brillouin scattering, an intense light beam can generate intense coherent sound; and that a reflected light beam simultaneously produced is doppler-shifted in frequency by an amount equal to the acoustic frequency. Further, it is known that the high degree of intensity and of collimation required for these interactions demands the intense and coherent light from a laser.

Such phenomena are known in the art and the theoretical aspects have been examined, the related apparatus and experimental results of tests therewith have been amply described, especially by Quate, Wilkinson and Winslow, in *Proc. IEEE*, Vol. 53, No. 10 for Oct., 1965, wherein the art of Brillouin scattering from 1922 to date, backed by a copious bibliography, is reviewed.

It is desirable to mention that Brillouin scattering has been variously used to detect the presence of sound; to measure the properties of sound; to extract power from the oscillating cavity of a laser; to measure the spatial distribution of acoustic waves in transparent crystals; and to measure attenuation and velocity in microwave sound at large attenuation frequencies in both liquids and solids. More recently, as described by C. A. Townes et al. in *Phys. Rev. Letters*, Vol. 12, p. 592, 1964, the damage occurring when a transparent crystal was subjected to an intense pulse from a Q-switched laser was postulated to be a result of stimulated Brillouin scattering.

Methods considered in United States Pat. No. 3,174,044 to Ping K. Tien to modulate the frequency of coherent light waves make use of an apparatus to first pass an optical beam through an optical-ultrasonic or electro-optical frequency translator, and then to make the frequency-translated beam fall parallel to an incident acoustic signal by means of a system of beam splitters and mirrors. Modulation of the acoustic beam then alters the angular position of the translated optical beam, hence disadvantageously requiring readjustment of the optical system to attain parallelism for each operational frequency.

It is an object of the present invention, therefore, to provide a frequency modulating apparatus to automatically maintain a constant parallelism of the interfering beams generated therein.

A further object of the present invention is to provide an apparatus to eliminate the use of beam splitters for both the optical beam and the acoustic beam, thus improving receiver sensitivity.

Another object of the present invention is to provide an apparatus to produce twice the frequency translations normal in the art by translating one beam up in frequency and shifting the other down.

Yet another object of the present invention is to provide an optical apparatus to process the heterodyne detection of doppler-shifted optical radar target echoes.

These and other objects of the invention are achieved in one embodiment of this invention at infrared laser wavelengths by the use of a traveling wave, ultrasonic frequency translator, comprising a block of germanium or gallium arsenide or tellurium, with a quartz ultrasonic transducer, optical antireflection coatings and an anechoic termination; and are similarly achieved at visible wavelengths by the use of other materials as, for example, quartz or zinc oxide. To insure a continuous ultrasonic wave signal in connection with that of the optical beam, the ultrasonic frequency translator is placed within the cavity of an optical signal generator, or laser. The laser is equipped with highly reflecting mirrors so oriented that all radiation energy emitted is diffracted by the ultrasonic beam present in the modulator crystal.

In contrast to the techniques of prior art for producing multiple frequency-translated optical beams by means of Brillouin scattering, the beams impinging upon a detector in the present invention emerge at full power level, since the intracavity modulator acts as an optical coupling window and can interact with a strong magnetic field.

The foregoing and other objects, features and advantages of the invention will be apparent from the following description of a preferred embodiment of the invention, and an alternate embodiment, as illustrated in the accompanying drawings.

Figure 1:
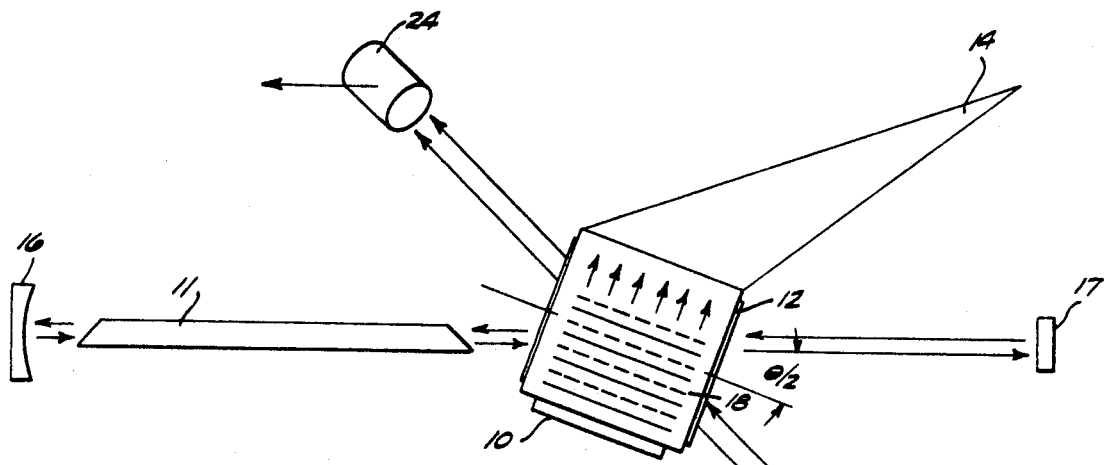
FIG. 1 is a schematic diagram without scale of the various elements in a preferred embodiment of the present invention.

With reference now to FIG. 1, a detailed description of the structure and operation of the present invention will be given, as best illustrated in use at wavelengths corresponding to the infrared range of the electromagnetic spectrum. It is to be further understood that the structure and operation of the present invention can similarly be used at wavelengths corresponding to the visible range of the spectrum, employing appropriate modulation media as, for example, quartz or zinc oxide. A traveling wave ultrasonic frequency translator 10, comprising a block of germanium or gallium arsenide or tellurium and incorporating a quartz ultrasonic transducer, is placed within the cavity of a laser, boundaries of which are not shown; but the laser amplifying medium, which may be solid, gas or liquid, is indicated as 11. The block is provided with optical antireflection coating 12, and a sound-deadened area, or anechoic termination 14, to insure the presence of the traveling ultrasonic waves. The system includes highly reflecting mirrors 16 and 17 in order that all energy emitted from the laser cavity will be diffracted by the ultrasonic waves present in the crystal modulator 18.

In the embodiment of the invention described, energy indicated as traveling from the transducer 10 leftward to the fully reflecting mirror 16 will produce an upward diffracted beam upshifted in frequency an amount $(w_o + W_s)$, where $w_o$ is the optical frequency of the local oscillator, or laser, and $w_s$ the ultrasonic frequency of the transducer. Energy indicated as traveling from the transducer 10 rightward to the fully reflecting mirror 17 will produce a downward diffracted beam downshifted in frequency an amount $(w_o - w_s)$, at the Bragg angle $\theta/2$, defined as the angle whose sine equals $_L/2\Lambda_S$, where $_L$ is the wavelength of light and $\Lambda_S$ the wavelength of sound.

It should be noted, as further explanatory to the above description, that an input signal to the transducer comprising a repetitive radio frequency pulse or large amplitude superimposed on a continuous, low-level radio frequency signal, both at frequency $w_s$, produces large-amplitude optical pulses simultaneously with cw optical signals, being emitted from the modulator 18 parallel but in opposite directions with opposite frequency translations. If the optical pulse at frequency $(w_o - w_s)$ is passed through an optical system, for example, a telescope 20, and permitted to reflect from a moving target 22, the reflected signal returning back through the telescope 20 will have a frequency of $(w_o - w_s + w_d)$, where $w_d$ is the doppler shift due to reflection from the moving target 22. This signal will then pass through the modulator 18 essentially unaltered, since the pulse repetition period is adjusted to be longer than the target echo delay, and the low-level, ambient ultrasonic wave in the modulator 18 is not sufficiently intense to produce modulation of the target echo signal.

The target echo at frequency $(w_o - w_s + w_d)$ and the low level local oscillator signal at frequency $(w_o + w_s)$ thus pass colinearly into a photodetector 24 and produce an output heterodyne signal at a frequency $(2w_s - w_d)$ representing the difference between the respective signal frequencies.

Since the rise time of the optical pulse and hence the minimum pulse duration is determined by the transit time of the ultrasonic wave across the optical beam in the modulator 18, an alternate embodiment of the apparatus is provided which produces shorter pulses for use in cases where the advantages of the embodiment described with reference to FIG. 1 may be limiting. An embodiment such as that shown in FIG. 2 may be needed, for example, in high resolution optical radar systems.

Figure 2:
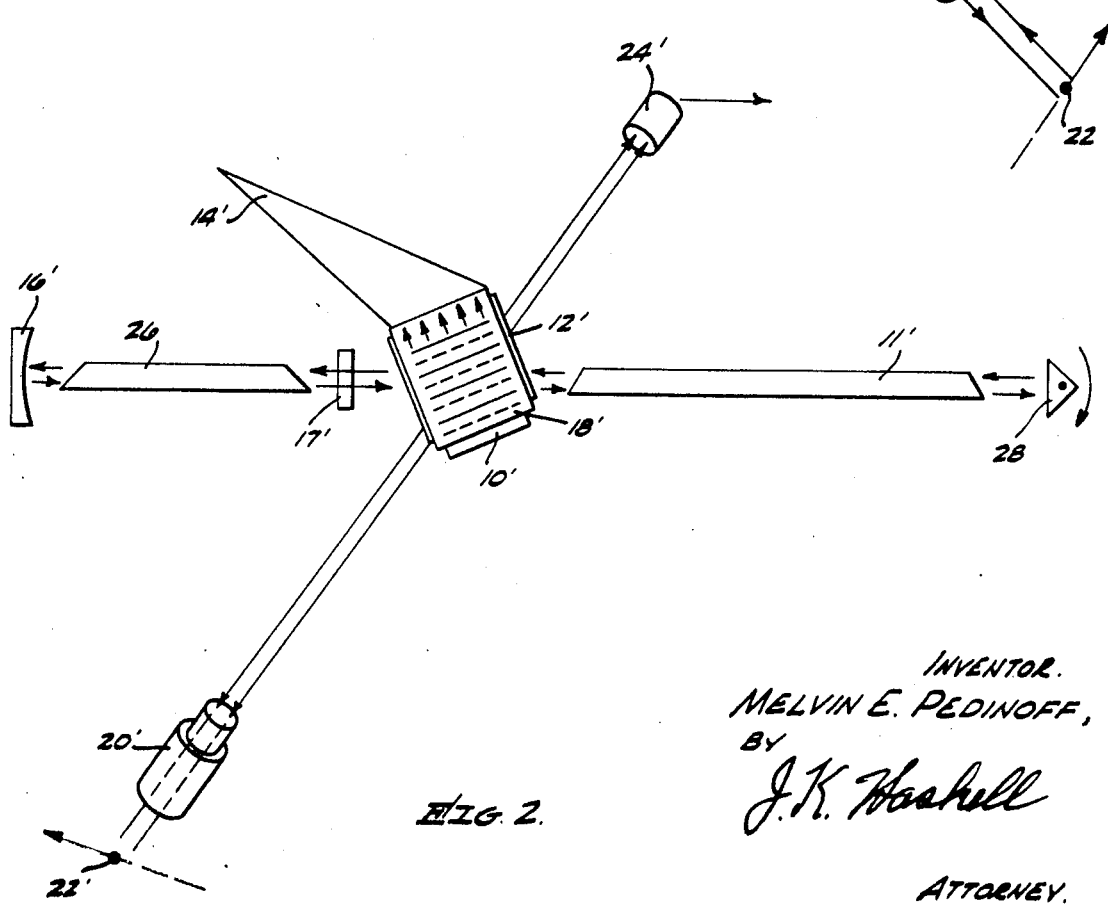
FIG. 2 is a similar diagram of an alternative mode of the preferred embodiment shown in FIG. 1.

With reference now to FIG. 2, features of an alternative, or Q-switched, structure and operation will be given. In this alternative embodiment a continuous ultrasonic traveling wave of frequency $w_s$ exists in the modulator 18'. A small or low-power laser 26 produces a continuous optical signal at frequency $w_o'$ which is reflected from a fully reflecting mirror 16' and a 99-percent reflecting mirror 17', and upon passage through the modulator 18' yields a low-power diffracted beam of frequency $(w_o' + w_s')$ which impinges on the photodetector 24'. The remainder of the beam at frequency $w_o'$ passes through the laser amplifying medium 11' and is scattered by a rotating prism or mirror 28. During rotation there is a preferred position of alignment when the rotating prism permits the signal at frequency $w_o'$ to return through the laser amplifying medium 11' to produce an intense optical pulse of frequency $w_o'$ which in turn produces an intense diffracted beam at frequency $(w_o' - w_s')$ for transmission through the telescope 20' to the moving target 22'.

As occuring in the embodiment described with reference to FIG. 1, the doppler-shifted frequency of the pulse upon reflection from the moving target 22' in FIG. 2 may be expressed correspondingly as $(w_o' - w_s' + w_d')$. Also correspondingly, the doppler-shifted delayed signal passes through the modulator 18' and impinges on the photodetector 24' colinearly aligned with the local oscillator signal at frequency $(w_o' + w_s')$, and the output signal from the photodetector 24' occurs at frequency $(2w_s' - w_d')$.

As may be readily seen by those skilled in the art, the operation of the apparatus as described with reference to both FIG. 1 and FIG. 2 will be essentially unchanged for multiple transits of the light beam through the laser cavity, provided the line width of the transiting beam is small compared to the ultrasonic frequency of the modulator. Further, as is now apparent from the matter delineated above as description and operation of the apparatus of the invention, variations of the modes of employment of the techniques indicated may provide certain additional advantages not heretofore obvious. It is to be noted that if a sufficiently large detector area is used in both the embodiments of FIG. 1 and FIG. 2 so that the optical beam at frequency $(w_o + w_s)$ strikes the detector for all values of $w_s$, then the angular position of the modulator for maximum Bragg modulation effect can be servo-controlled merely by rotating the modulator to the position which produces a maximum dc detector output signal because of the symmetrical nature of the ultrasonic Bragg diffraction phenomenon.

It is also to be noted that a slight variation of the ultrasonic frequency will effect a variation of the angular position of the optical beam without the necessity of reorienting the modulator crystal, warranting a useful adjunct to a mechanical system in the tracking of moving targets. Further, it is to be noted that for gross angular position changes, a change in the position of the modulator as well as a change in the ultrasonic frequency will maintain the intensity of the diffracted beams essentially constant.

It is lastly to be noted that since the embodiments of the invention as described produce a double frequency translation $(2w_s)$, the range of usefulness of ultrasonic frequency translators is doubled by use of the present invention, extending to high frequencies without the requirement of excessively high ultrasonic frequencies; and that regardless of the ultrasonic frequency selected, the apparatus of the invention is seen to automatically present parallel signal and local oscillator beams to the target, for any optical or infrared wavelength employed. Since doppler shift is known to be a sensitive measure of translational velocity of long- and short-range targets, optical frequency radar, producing larger doppler frequency shifts than microwave frequency radar, effects increased accuracy in detection and tracking. And while the invention has been particularly shown and described with reference to preferred embodiments thereof, it will further be understood by those skilled in the art that various changes in form and details may be made therein without departing from the spirit and scope of the invention.

What is claimed is:

1. In a frequency modulating apparatus, the combination of:

an active laser medium, means coupled to said medium for inducing a population inversion therein, and means including optical elements positioned about said medium for stimulating coherent emission from said active medium for providing a first pair of oppositely propagating coherent electromagnetic continuous optical waves travelling along a selected path which extends through said medium;

a frequency modulator positioned in the path of the first pair of optical waves and including
radio frequency pulsed wave energy beam means for providing an acoustic wave in said frequency modulator for receiving the first pair of optical waves and acoustic wave, and
means for diffracting the first pair of optical waves to produce a second pair of oppositely directed optical waves of opposite frequency translation and for transmitting the frequency translated optical waves along oppositely directed colinear paths angled with respect to the path of the first pair of optical waves;
means positioned in a first of the oppositely directed colinear paths for redirecting a first of the pair of the frequency translated optical waves through said frequency modulator, the pulse repition period of the radio frequency pulses and the strength of the acoustic wave being such to enable the redirected wave to pass through said frequency modulator essentially unaltered; and
a photodetector receiver positioned in a second of the oppositely directed colinear paths for receiving the redirected first of the pair of the frequency translated optical waves and a second of the pair of the frequency translated optical waves.

2. An apparatus as in claim 1 wherein the material of said modulator is selected from the group consisting of germanium, gallium arsenide and tellurium, and wherein said means for producing the acoustic wave comprises a piezoelectric ultrasonic transducer.

3. An apparatus as in claim 1 wherein said frequency modulator includes means capable of operating said frequency modulator close to a Bragg angle.

4. An apparatus as in claim 1 wherein said photodetector receiver includes means for producing a heterodyne output signal.

5. A method for generating two oppositely directed, continuous wave and pulse modulated colinear and parallel electromagnetic wave energy beams, one of the beams having a frequency translation opposite from the frequency translation of the other of the beams, comprising the steps of:
directing a pair of oppositely propagating electromagnetic continuous wave energy beams and a radio frequency pulsed wave energy beam into a frequency modulating apparatus, the continuous wave energy beams being directed substantially at the Bragg angle or at a multiple thereof with respect to the frequency modulator;
frequency modulating the continuous wave energy beams by the pulsed wave energy beam in the frequency modulating apparatus to simultaneously produce an interaction of continuous wave modulation energy of the two continuous wave beams with pulse modulation energy to produce from the interaction the two oppositely directed, continuous wave and pulse modulated colinear and parallel electro-magnetic wave energy beams having opposite frequency translations;
producing a time delay in a first of the two frequency translated beams less than the pulse repetition period of the modulating pulse obtained in said frequency modulating step by propagation of the first beam over an optical path having a length sufficient to produce the time delay;
redirecting the time delayed beam through the frequency modulating apparatus;
maintaining the intensity of the pulse wave energy beam in the frequency modulating apparatus at a level not sufficiently intense to produce modulation of the redirected beam; and
recombining and photo-mixing the time delayed first beam and the second of the two frequency translated beams for detecting the time position of the time delayed optical signal.

6. In a frequency modulating apparatus, the combination of:
a first active laser medium;
a first resonant optical cavity having an axis and being positioned about said active laser medium, said cavity having first and second reflectors for stimulating coherent emission from said active laser medium for providing a low power coherent electromagnetic light wave propagating along said axis;
a second laser medium;
a second optical resonant cavity being positioned about said second laser medium and having an axis colinear with said first cavity axis, said second optical resonant cavity comprising said second reflector and a third rotatable reflector for enabling Q-switching of said second laser medium;
a frequency modulator including means for providing an acoustic wave in said frequency modulator;
said second reflector being constructed and positioned to transmit the low-power optical wave emitted to said frequency modulator, thereby yielding a low-power diffracted optical beam, and said rotatable reflector posi-tioned in the path of said optical wave for amplification and refection thereof by said rotatable reflector in one position of alignment during rotation thereof for Q-switched retransmission of the optical wave into said frequency modulator to produce therefrom a high powered diffracted optical pulse oppositely directed from the low-power diffracted optical beam; and
a photodetector receiver in the path of the low-power diffracted optical beam for reception thereof.

* * * * *